United States Patent [19]
Miyoshi et al.

[11] Patent Number: 5,452,784
[45] Date of Patent: Sep. 26, 1995

[54] FRICTIONAL ENGAGEMENT APPARATUS

[75] Inventors: Tatsuro Miyoshi, Kanagawa; Shigeki Umezawa, Shizuoka, both of Japan

[73] Assignee: NSK - Waner Kabushiki Kaisha, Tokyo, Japan

[21] Appl. No.: 93,320

[22] Filed: Jul. 16, 1993

[30] Foreign Application Priority Data

Jul. 23, 1992 [JP] Japan ................... 4-057239 U

[51] Int. Cl.$^6$ ............... F16D 11/14; F16D 13/60
[52] U.S. Cl. ............... 192/107 M; 192/70.14; 106/36
[58] Field of Search ............ 192/107 M, 70.14; 106/36

[56] References Cited

U.S. PATENT DOCUMENTS

| | | | |
|---|---|---|---|
| 3,398,822 | 8/1968 | Eakin | 192/107 M |
| 4,180,622 | 12/1979 | Burkhard et al. | 428/564 |
| 4,552,259 | 11/1985 | Albertson | 192/107 M |
| 4,618,049 | 10/1986 | Pflaüm et al. | 192/107 M |
| 4,700,823 | 10/1987 | Winckler | 192/107 M |
| 5,029,686 | 7/1991 | Yesnik | 192/70.14 |
| 5,048,654 | 9/1991 | Yesnik | 192/70.14 |

FOREIGN PATENT DOCUMENTS

| | | | |
|---|---|---|---|
| 3326409 | 3/1984 | Germany | 192/70.14 |
| 4-15320 | 2/1992 | Japan . | |
| 4-366029 | 12/1992 | Japan . | |

*Primary Examiner*—Andrea L. Pitts
*Attorney, Agent, or Firm*—Pearne, Gordon, McCoy & Granger

[57] ABSTRACT

A frictional engagement apparatus which is small in size, high in torque, and long in endurance life and includes driven and driving plates. A frictional material is provided on one surface of each of the driven and driving plates, while a ceramic thin film composed of $IV_B$, $V_B$, or $VI_B$ family elements, such as titanium, in the periodic table of elements, Si, Al, and carbides, nitrides and oxides thereof, is formed on the other surface. The ceramic thin film includes a ceramic thin film intermediate layer formed on a surface of the respective plate, and a ceramic thin film layer formed on the intermediate layer.

4 Claims, 9 Drawing Sheets

FRICTIONAL ENGAGEMENT APPARATUS

BACKGROUND OF THE INVENTION

1. Field of the Invention

The present invention relates to a frictional engagement apparatus using a wet frictional material.

2. Description of the Related Art

FIG. 1 shows an example of a frictional engagement apparatus in which torque is transmitted through contact between driving plates 2 fitted in a spline portion 51 of a hub 5 inserted onto an input shaft 6 and driven plates 1 fitted in a spline portion 41 of a retainer 4. In the drawing, the reference numeral 3 designates a pressure plate and the reference numeral 7 designates a piston for pressing.

Presently, in view of energy and environmental problems, such a frictional engagement apparatus is required to be small in size, light in weight, small in operational shock, and high in torque capacity. The foregoing requirements are extremely strong.

In a conventional frictional engagement apparatus, however, lubricating oil with a low friction coefficient has been widely used in order to reduce operational shock, and, therefore, miniaturization of the frictional engagement apparatus inevitably causes low torque capacity. Accordingly, the operational pressing force is required to be made high to increase the torque capacity, resulting in defects relating to reduction of the separation life of a wet frictional material, generation of heat spots and thermal deformation in a mate-frictional surface (driven plate), increase in size of an oil pump, reduction in endurance life such as leakage of operational oil, and the like. It is therefore necessary to take the safety factor into consideration in order to solve the above problems and it is difficult to reduce the size of the apparatus per se.

In order to solve the foregoing problems, a high dynamic friction coefficient ($\mu$d) and a high static friction coefficient ($\mu$s) could be indeed obtained by forming a single layer of a ceramics thin film on the mate-frictional surface, and the above problems such as miniaturization of the apparatus could be solved by maintaining an ideal torque waveform without any change over time.

In the present and future environment, however, the frictional engagement apparatus is being used and will be used under stricter and stricter conditions, and a film formed on the frictional surface according to conventional techniques is affected by acid components and the like generated by decomposition of lubricating oil due to extremely high exothermicity, surface pressure (force), and high heat so that cracks, separation, or falling off is caused, and thereby making it difficult to maintain stable quality.

If a boron nitride group film containing cubic boron nitride (C-BN), cubic SiBN (C-SiBN) or cubic BCN (C-BCN), which is a super hard material, is formed as a matrix on the frictional surface, a brittle layer is formed by dispersion of boron (metal boron) in the matrix so that the matrix becomes brittle disadvantageously.

Moreover, such ceramics thin film materials are so expensive that a metal plate subjected to surface treatment is more expensive than a current or conventional metal plate, and it is difficult to improve the function correspondingly to the increase of the cost. Accordingly, it has remained difficult to succeed in manufacturing these ceramic plates since the increase in performance does not justify the increase in price.

Further, FIG. 2 shows a conventional arrangement of driven and driving plates 1, 2 and FIG. 3 shows a side view thereof. As shown in FIGS. 2 and 3, each driving plate 2 includes a metal plate 9 upon each side surface of which is bonded a frictional material 8. Each driven plate 1 has a metal plate 9, opposite side surfaces of which have a ceramics thin film formed thereon. In the drawings, the reference numeral 91 designates spline teeth provided by the metal plate 9 for both the driven and driving plates 1, 2 which is a matrix, for the sake of gearing with a spline. However, such a configuration of a frictional material 8 bonded on each of the opposite surfaces of the driving plate 2 causes defects which will be described later.

SUMMARY OF THE INVENTION

It is therefore an object of the present invention to solve at least some of the foregoing problems in the conventional art. It is another object of the present invention to provide a frictional engagement apparatus which is small in size, light in weight and high in torque, and by which it is possible to obtain highly reliable products.

In order to attain the above objects, according to the present invention, provided is a frictional engagement apparatus for transmitting power by frictional force between a driven plate and a driving plate, each plate being formed by bonding a wet frictional material with a metal plate such as a steel plate, an aluminum plate, or the like. A frictional material is provided on one surface of each of the driven and driving plates, and a ceramics thin film is formed on the other surface of each of the driven and driving plates. The ceramics thin film is composed of a member selected from the group consisting of the elements of Groups $IV_B$, $V_B$ and $VI_B$ of the periodic table, silicon, and aluminum, and the carbides, nitrides, and oxides thereof.

A ceramics material is formed as a thin film on one surface of a metal plate such as a steel plate, an aluminum plate, or the like, forming each of the driven and driving plates of the frictional engagement apparatus shown in FIG. 1. It is preferable that the thin film has a thickness of between about 0.01 $\mu$m and 6 $\mu$m. The thin film may be formed through evaporation, sputtering, ion plating, other physical/chemical evaporations, or the like.

First, with the frictional surface on which a multi-layered ceramic thin film is formed in a plurality of layers, the friction coefficient can be prevented from being changed for a long time even in hard use and is always stable from initial time until after endurance in comparison with a single-layered film.

Second, it is possible to prevent a tight contact force between a matrix and a coating material from being lowered (due to corrosion or the like) by the attack of an acid substance generated by thermal deterioration of lubricating oil.

Third, the frictional surface (multi-layer film) improves the tight contact force between a matrix, an intermediate layer, and a surface layer more than in a single-layered film, so that it is possible to prevent thermal deformation such as production of heat spots or the like caused by frictional heat of high temperature, and it is possible to prevent injury of the frictional surface by cracking, separating, falling off, and so on from occurring.

Fourth, the characteristic expressing the change of a frictional coefficient $\mu$ as the sliding speed changes (hereafter referred to as the $\mu$-v characteristic) becomes flat or descending rightward, so that it is not only very advantageous in reduction of an operation shock but it is also possible to prevent self-oscillation from occurring even in use for continuous sliding.

Fifth, the absolute level of torque (dynamic friction coefficient μd and static frictional coefficient μs) is improved by 20 to 40%, so that it is possible to reduce the number of used sheets of clutches and reduce the size.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 4:
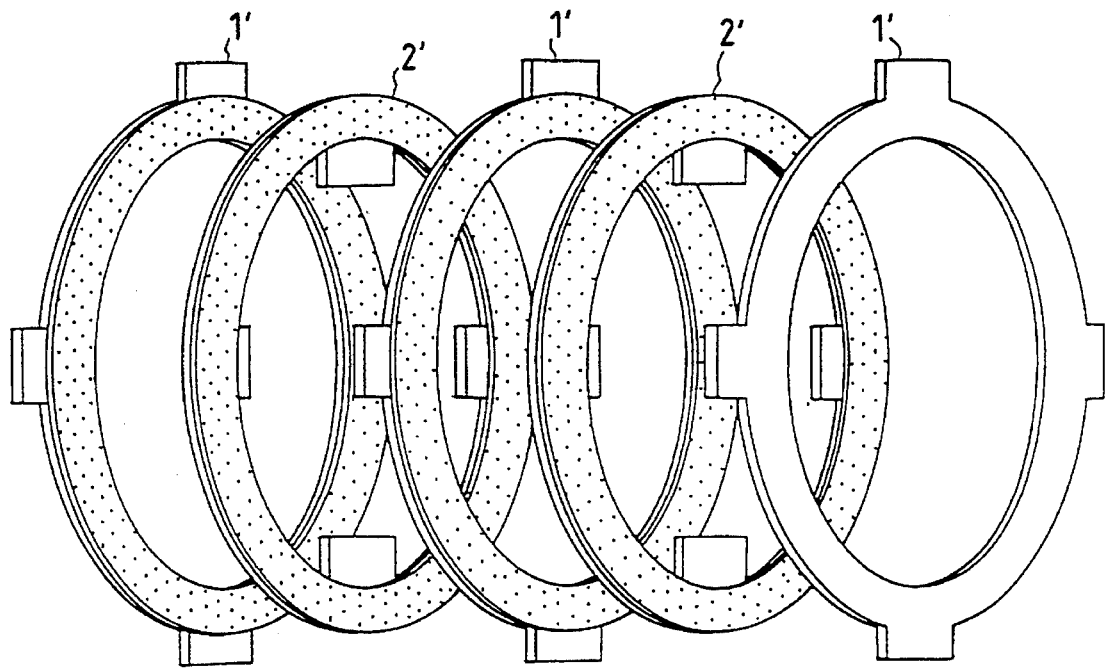
FIG. 4 is a diagram illustrating an arrangement of driven and driving plates according to the present invention.
Figure 5:
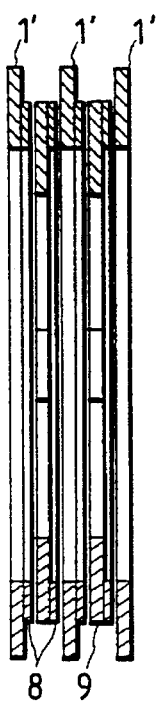
FIG. 5 is a side sectional view illustrating the driven and driving plates according to the present invention.

With reference to the drawing figures, the preferred embodiments of the present invention will be described hereafter. FIG. 4 illustrates the arrangement of driven and driving plates 1', 2' provided with a frictional material on one of their two opposed surfaces, and FIG. 5 is a sectional view of the assembly shown in FIG. 4. In the drawings, a friction material 8 is bonded to one surface of a metal material 9 in each of driven plates 1' and driving plates 2' while a ceramics thin film according to the present invention is formed on the other surface of the metal material 9.

Figure 9:
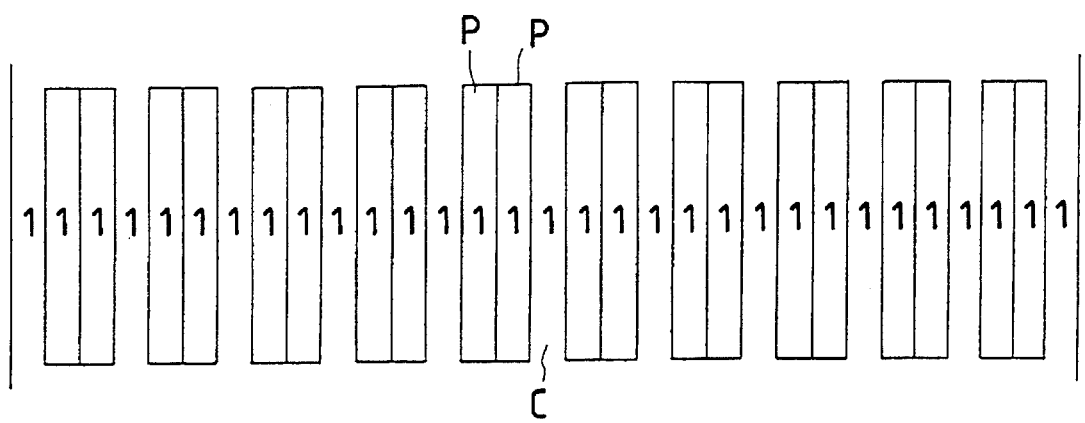
FIG. 9 is a diagram for explaining an arrangement in a heat treatment furnace of metal plates provided with a frictional material only on one surface.
Figure 10:
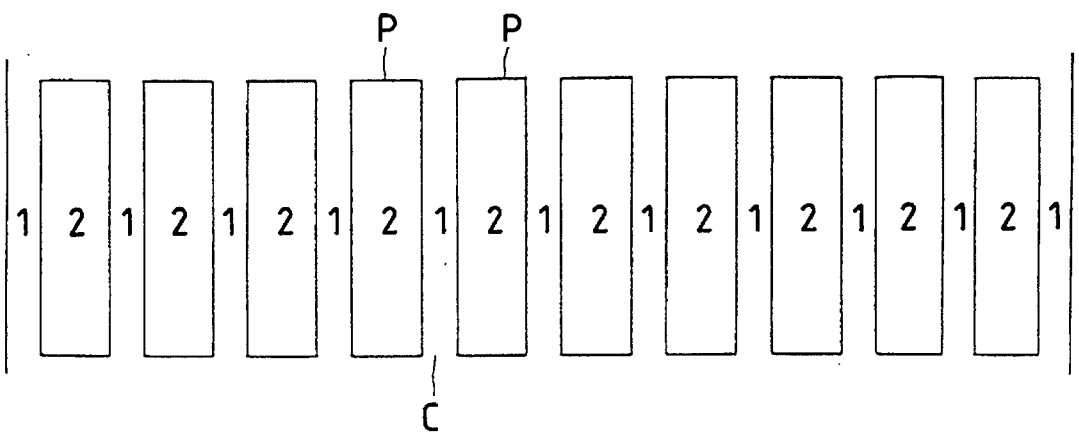
FIG. 10 is a diagram for explaining a conventional prior art arrangement in a heat treatment furnace of metal plates providing a frictional material on both surfaces.

FIG. 9 et seq. are diagrams for explaining advantages in the case of providing a frictional material on only one surface. Particularly, FIG. 9 is a diagram for explaining an arrangement in a heat treatment furnace of metal plates provided with a frictional material on only one of their surfaces, and FIG. 10 is a diagram for explaining a conventional arrangement, in a heat treatment furnace, of metal plates which become driven plates in the case of providing a frictional material on both the opposite surfaces of each driving plate. To form a thin film on only one surface of the metal plate of each of the driven and driving plates, metal plates P are put back-to-back, as shown in FIG. 9, such that only the surfaces thereof on which a thin film is to be formed are exposed. Thus, arranged sets of metal plates P are disposed in the furnace at regular intervals C. The numerical values in the drawings designate relative dimensions of the thickness of each metal plate and the gap between adjacent sets of metal plates.

On the other hand, in conventional driven plates, metal plates P should be disposed in the furnace through gaps to form a thin film on the opposite surfaces of each metal plate P, as shown in FIG. 10, and each metal plate P is twice as thick as the gap C between adjacent plates. Therefore, as seen from FIGS. 9 and 10, the number of plates which can be treated is doubled, as compared to the conventional method of forming a thin film on both opposite surfaces, when a thin film is formed on only one surface, thereby making it possible to reduce the cost by 50%.

Figure 11:
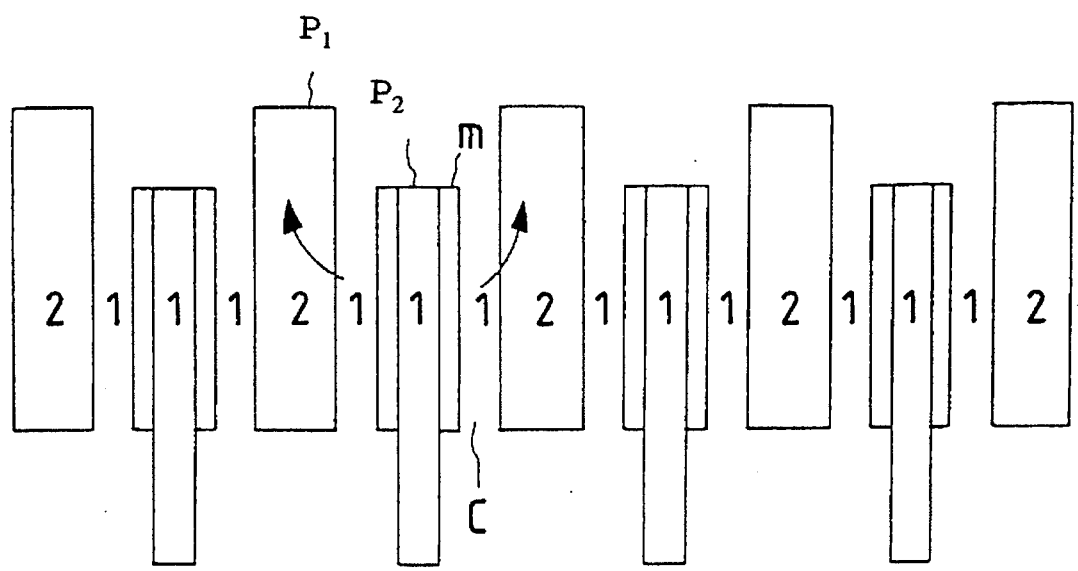
FIG. 11 is a diagram for explaining a conventional prior art arrangement in which a frictional material is provided on both surfaces.
Figure 12:
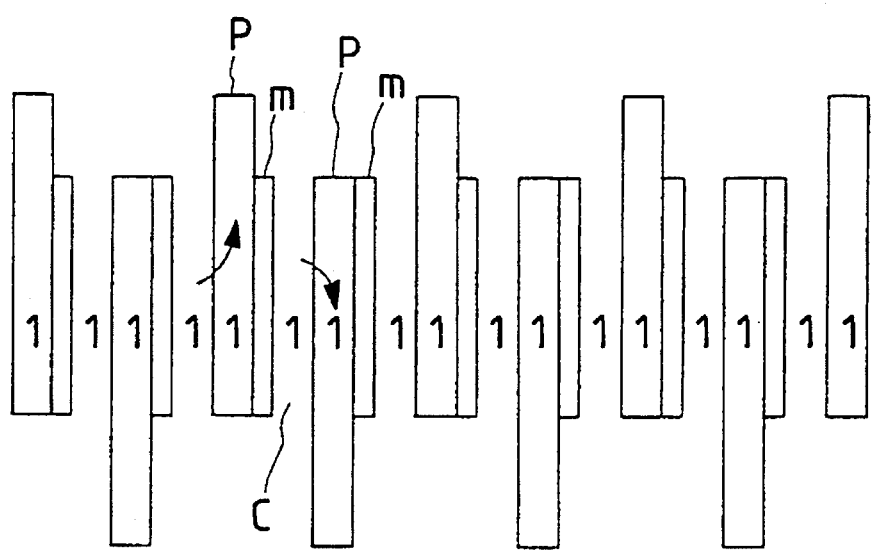
FIG. 12 is a diagram for explaining an arrangement in which a frictional material is provided only on one surface.

Next, FIG. 11 shows a conventional arrangement in which a frictional material is provided on both the opposite surfaces of each driving plate, and FIG. 12 shows an arrangement in which a frictional material is provided on only one surface of each plate. The flow of frictional heat is as follows. The numerical values in FIG. 11 and 12 designate relative dimensions of the thicknesses and gaps. In the case of FIG. 11, a frictional material m is provided on the opposite surfaces of a metal matrix $P_1$ of each driving plate. Since the frictional material is adiabatic, frictional heat does not flow toward the metal matrix $P_1$ of each driving plate, but all the heat flows toward a metal matrix $P_2$ of each driven plate.

On the other hand, when providing a frictional material on only one surface as shown in FIG. 12, frictional heat flows to the opposite surface side of the frictional material uniformly in each of driven and driving plates, so that it is possible to reduce the thickness of the driven plates by 50% compared to the case illustrated in FIG. 11. In FIGS. 11 and 12, assuming the thickness of a frictional material m is half of the metal plate P which is equal to that of the gap C, and the thickness of the metal plate P, the metal matrix $P_2$ and the gap C are 1 unit so that the thickness of the frictional material m is 0.5 unit and that of the metal matrix is 2 unit, in the case of four driving plates, the total size is 26 units in FIG. 22 while the total size is 21 units in FIG. 12, whereby miniaturization by 20% can be realized in FIG. 12.

Further, the friction coefficient is increased by forming a ceramics thin film, so that the number of plates can be reduced if the torque capacity and the diameter are the same, making it possible to realize miniaturization by about 40% as the result of total effects.

Figure 6:
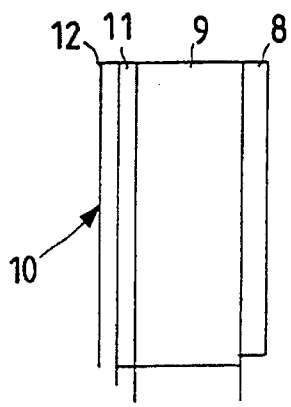
FIG. 6 is a sectional view of an example of the driven and driving plates according to the present invention.

FIG. 6 shows a sectional diagram of driven and driving plates according to the present invention in which a wet frictional material 8 is bonded to one surface of a metal matrix 9, and a ceramics thin film 10 is formed on the other surface of the metal matrix 9. In the drawing, the thickness of the thin film is exaggerated for illustration purposes.

To obtain the ceramics thin film 10 according to the present invention, an intermediate layer 11 is formed on the surface of the metal matrix 9, and then a surface layer film 12 is formed on the surface of the intermediate layer 11. The intermediate layer 11 is composed of any material selected from $IV_B$ family elements, such as titanium, in the periodic table of the elements, $V_B$ family elements, such as niobium, in the periodic table of the elements, $VI_B$ family elements, such as molybdenum, in the periodic table of the elements, Si, Al, and carbides of those foregoing elements, and nitrides of those foregoing elements, and oxides of those foregoing elements. The metal matrix 9 is composed of any metal material such as a steel plate, an aluminum plate, and the like, ceramics such as alumina, silicon nitride, silicon carbide, and the like. The surface layer film 12 is composed of any selected from $IV_B$ family elements, such as titanium, in the periodic table of the elements, $V_B$ family elements, such as niobium, in the periodic table of the elements, $VI_B$ family elements, such as molybdenum, in the periodic table of the elements, Si, Al, and carbides of those foregoing elements (such as MoC), and nitrides of those foregoing elements (such as TiN), and oxides of those foregoing elements (such as $Al_2O_3$) but selected differently from the component of the intermediate layer 11.

Alternatively, a boron nitride group film 13 containing cubic boron nitride (C-BN), cubic SiBN (C-SiBN) or cubic BCN (C-BCN) is further formed on the surface of the intermediate layer 11.

The foregoing elements to be used for the intermediate layer 11 are substances which are hard, per se, and carbides, nitrides, and oxides of those elements become harder and, therefore, are preferably used as materials for the intermediate layer.

Figure 7:
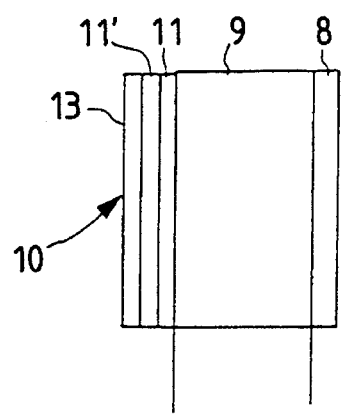
FIG. 7 is a side view illustrating another example of the driven and driving plate according to the present invention.

The intermediate layer 11 may be constituted by a single layer or a plurality of layers. FIG. 7 shows a configuration wherein the boron nitride group film 13 is formed on the surface of a lamination of intermediate layers 11 and 11'.

If the intermediate layer is constituted by a plurality of layers, for example, tight contact force between the mother material 9, the intermediate layers 11 and 11', and the surface layer film 12 is so strong as to improve the attachment to the boron nitride group film 13 formed finally, so that it is possible to improve the tight contact of the boron nitride group film 13.

Preferably, the total thickness of the intermediate layer 11 is between about 0.05 μm to 0.5 μm. This is because boron dispersion prevention in the matrix 9 is reduced if the intermediate layer 11 is too thin and because, from the point of view of maintaining the hardness of the surface of the ceramics thin film 10, it is preferable to restrain the thickness of the intermediate layer 11 to a value not larger than about several tenths of the thickness (usually, for example, about 2 μm) of a surface layer forming film after initial abrasion in the case of use as a frictional engagement apparatus.

With regard to the boron nitride group film 13, the intermediate layer 11 functions as a barrier to the dispersion of boron which is a component thereof so that the boron is prevented from being dispersed in the matrix even when the temperature increases. That is, the production of a brittle layer is prevented by the intermediate layer 11. Therefore, the above-mentioned ceramic thin film 10, making the most of the property of high hardness of the boron nitride group film 13, has a long life without cracks, separation, or falling off.

In addition, the presence of the intermediate layer makes it difficult to separate off $IV_B$ family elements, such as titanium, $V_B$ family elements, and $VI_B$ family elements in the periodic table of the elements, Si, Al, and carbides of the foregoing elements, and nitrides of the foregoing elements and oxides of the foregoing elements, or the boron nitride group film 13 compared to the case of forming the surface layer directly on the matrix 9. It is believed that this is because the intermediate layer, which is an intermediate hard material, acts as a buffer material to relax the stress between the matrix and the surface layer.

Moreover, when using ceramics as the mother material 9, conventional metalization methods (which is a method of tightly attaching a metal thin film to the ceramic surface, the attached metal thin film being called a metalized layer) merely give physical force to the joint interface between the ceramic surface and the metalized layer to thereby join both so that the metalized layer separates and falls off under the above-mentioned conditions in the ceramic-metal-layer boundary. Therefore, if an ion mixing layer 11' of the mixture of ceramic and metal is formed as an intermediate layer, a metal thin film (ceramic thin film 10) is formed on the surface, so that it is possible to improve the joint strength of the boundary layer several times as large as a conventional metalized layer.

Figure 8:
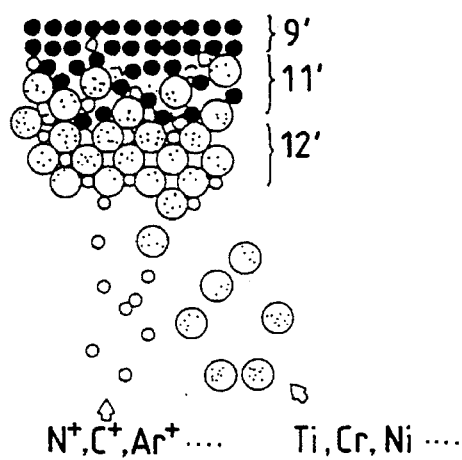
FIG. 8 is a conceptual diagram of an ion mixing layer.

FIG. 8 shows the aspect in which a mixing layer 11' of ceramics and TiN or the like is formed on a ceramic layer 9' and a TiN layer 12 is formed on the surface by evaporation or the like.

When ceramic thin films are formed on the surface of the metal plate 9, which is a matrix, the sequence of the film formation is a problem. Since TiC>TiN in tight contact force with iron, a TiC layer is formed in tight contact with a metal plate, and a TiN layer is formed on the surface of the TiC layer to thereby improve the tight contact force to solve the problem of easy separation of the films.

FIGS. 13 to 16 show the characteristics of frictional force (torque) corresponding to the change in sliding speed in endurance tests under the conditions of the surface pressure of 2 MPa and the peripheral speed of 20 m/s.

Figure 13:
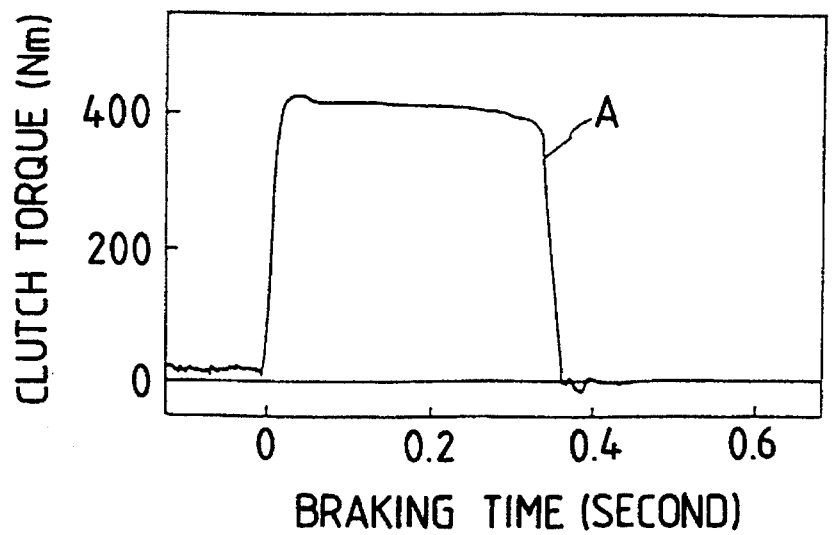
FIG. 13 is a diagram illustrating the relationship between clutch and torque and initial time of endurance of braking time according to the present invention.
Figure 14:
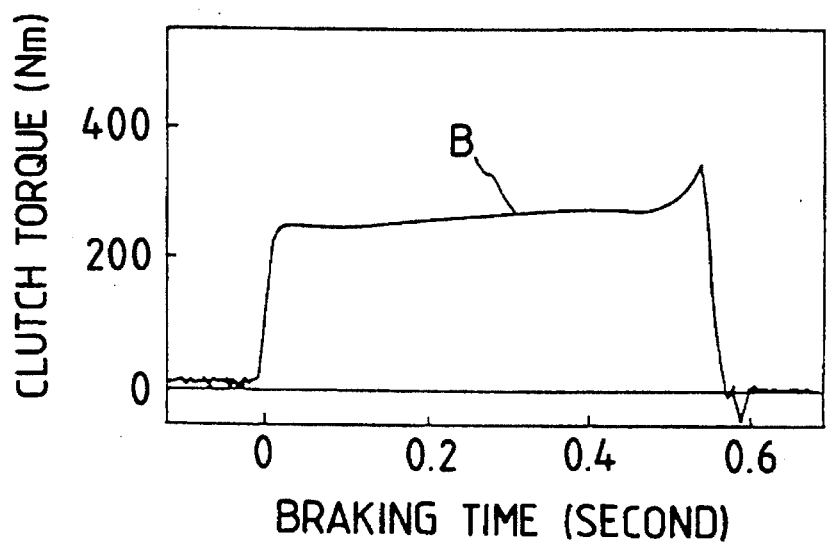
FIG. 14 is a diagram, similar to FIG. 13, illustrating the relationship between clutch torque and initial time of endurance of braking time in conventional art.

FIG. 13 shows the characteristic in initial endurance according to the present invention, and FIG. 14 shows the same in the conventional art. In each of the drawings, the abscissa represents the clutch torque (frictional force), and the ordinate represents braking time (time necessary to stop a rotating flywheel). In the drawings, the curves A and B designate the characteristics according to the present invention and the conventional art, respectively.

Figure 15:
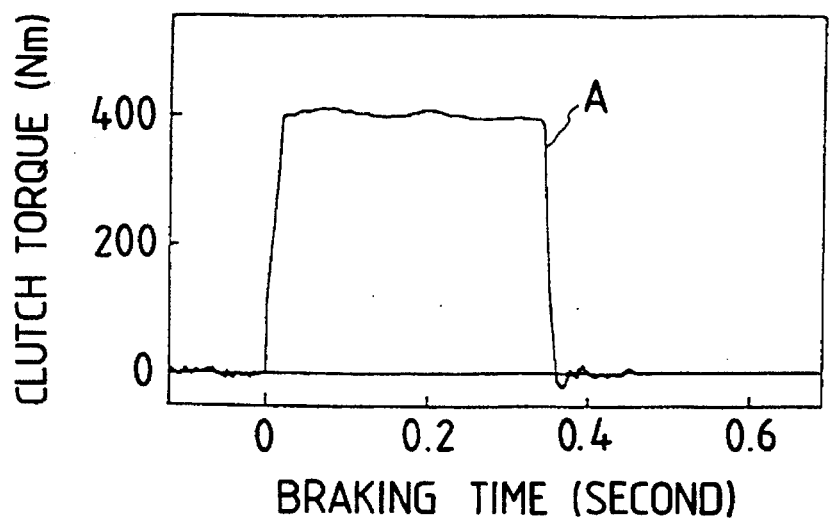
FIG. 15 is a diagram, similar to FIG. 13, illustrating the relationship between clutch torque and initial time of endurance of braking time according to the present invention after endurance.
Figure 16:
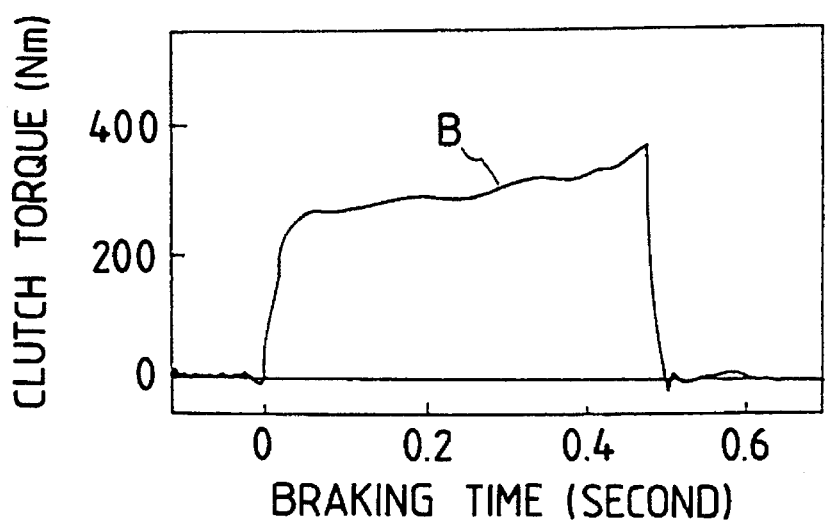
FIG. 16 is a diagram, similar to FIG. 13, illustrating the relationship between clutch torque and initial time of endurance of braking time in conventional art after endurance.

FIG. 15 shows the characteristic according to the present invention after endurance, and FIG. 16 shows the same in the conventional art.

In the characteristic of the conventional art (FIGS. 14 and 16), a peak called a "rooster tail" is produced immediately before stop, and the μ-v characteristic (the characteristic representing the change of a friction coefficient μ as the sliding speed changes) shows a rightward-rising characteristic which is disadvantageous for operation shock.

In the present invention (FIGS. 13 and 15), a "rooster tail" is not seen in spite of using the same wet frictional material and the same lubricating oil, and the μ-v characteristic tends to be a flat or a rightward falling characteristic with a result that the absolute level of torque (the dynamic friction coefficient μd and the static friction coefficient μs) is improved by 20 to 40%. This is not only very advantageous for operation shock, but it is also possible to obtain a high torque capacity while restraining self-oscillation from being produced even in use for continuous sliding.

Figure 17:
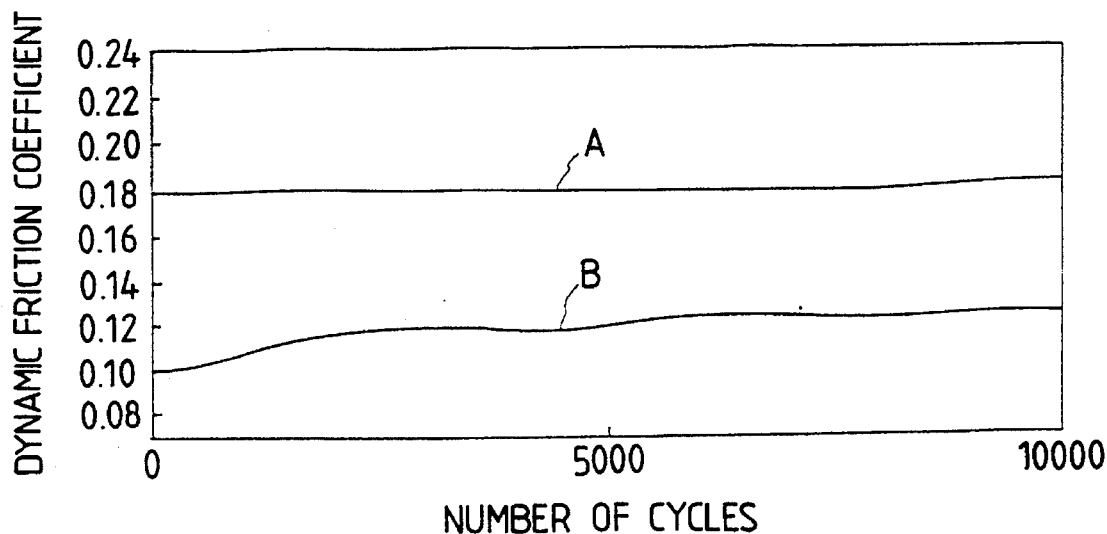
FIG. 17 is a diagram illustrating the change of a dynamic friction coefficient over time.
Figure 18:
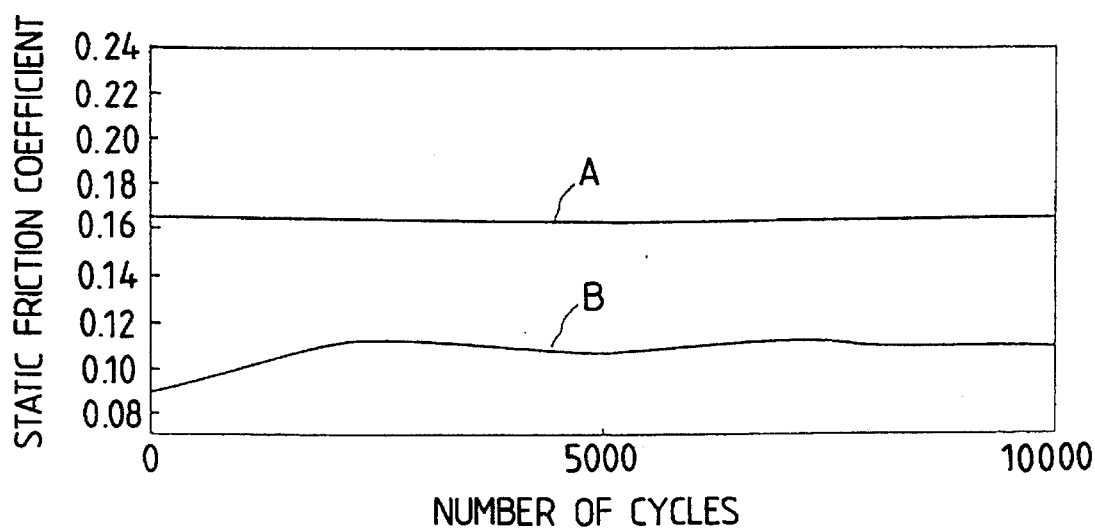
FIG. 18 is a diagram illustrating the change of a static friction coefficient over time.

FIGS. 17 and 18 show changes over time of friction coefficients (the dynamic and static friction coefficients) during endurance tests according to the present invention and the conventional art. FIG. 17 shows the dynamic friction coefficients, and FIG. 18 shows the static friction coefficients. In each of the drawings, the curves A and B show the present invention and the conventional art, respectively.

In both drawings, the characteristic A is stable and flat independent of the number of cycles (the number of tests). Contrarily, the characteristic B of the conventional art shows a large change over time.

Further, in estimation of heat-proof and endurance, confirmation was made by increasing energy by 2.5 times (with the surface pressure of 2 Mpa and the peripheral speed of from 20 to 32 m/s), and it was found that heat spots and abnormal abrasion of a wet frictional material were produced in a driven steel plate provided with no ceramic thin film. In a driven plate constituted by a single layer, indeed heat spots were not produced, but a ceramic thin film was separated or fallen off so that the dynamic friction coefficient varied on a large scale. In a multi-layer ceramic thin film according to the present invention, no problem was found in the friction coefficients and surface state (cracks, separation, falling off, and so on) while the surface became lustrous as if it had been lapped.

Acid substances have no influence in the case of use in a dry system. It is, however, known that lubricating oil is decomposed by heat in the case of use in oil and under strict conditions so that acid substances are generated. In the case of a single-layered film, the film thickness is not always uniform, and in some case there are pin holes (minute portions in which a mother material is not coated). Although coating is not an object of corrosion, in the case of a matrix of a steel plate, corrosion is produced in the joint boundary surface in some cases so that the tight contact force is reduced, causing the coating to separate and fall off.

It has been actually confirmed that there is a case where lubricating oil in an automatic transmission becomes a strong acid of about pH 1, and influences are given from the inside while no influence is given onto a formed film. It is therefore possible to improve the endurance life of a wet frictional material and improve the endurance life as a frictional engagement apparatus under strict conditions.

Figure 1:
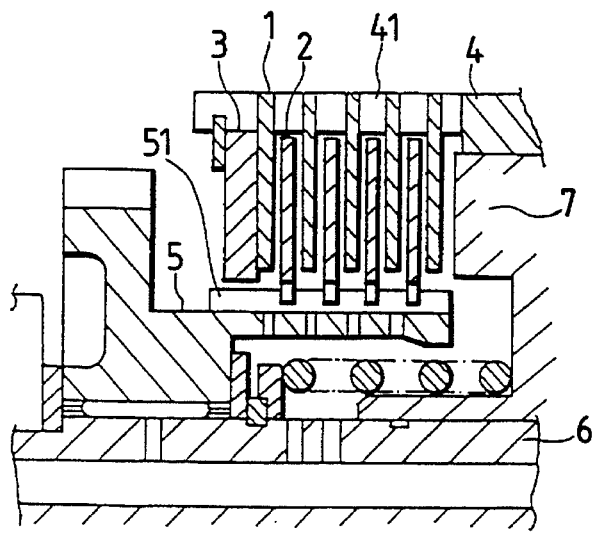
FIG. 1 a side sectional view of an example of a prior art frictional engagement apparatus.
Figure 19:
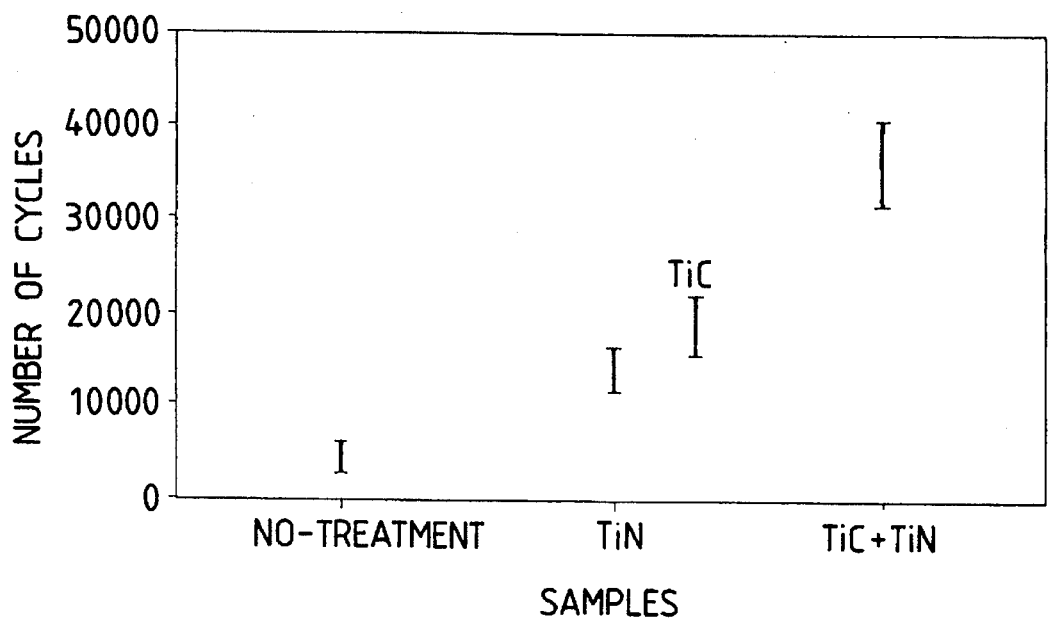
FIG. 19 is a diagram illustrating the comparison of numbers of cycles until the friction coefficient is reduced by 20%.
Figure 2:
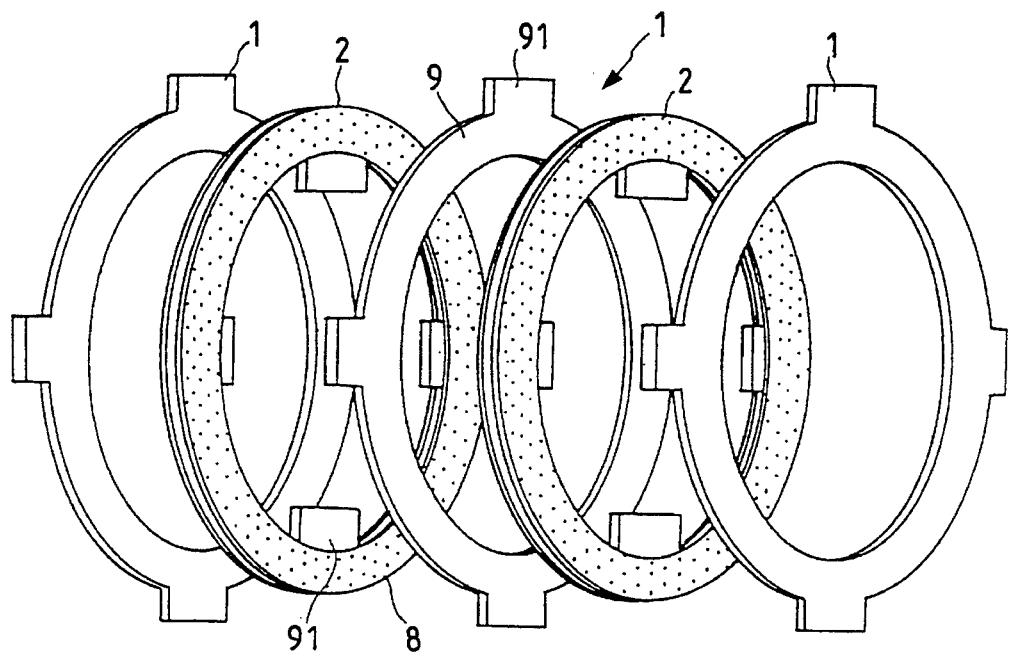
FIG. 2 is a diagram illustrating a conventional arrangement of driven and driving plates.

FIG. 19 shows the number of cycles until the friction coefficient is reduced by 20% by acceleration tests. In FIG. 19, the abscissa represents the number of cycles, and the ordinate represents samples (kinds of treatments).

In a working process for forming coatings of TiC and TiN on a steel plate, the steel plate never gets out of a furnace, Ti being an evaporated substance from an evaporated source is fixed, and reactive gas is converted as if $CH_4$ or $N_2$, so that a compound can be formed. A variety of compounds can be formed by various combinations of the evaporated substance and the reactive gas.

Figure 3:
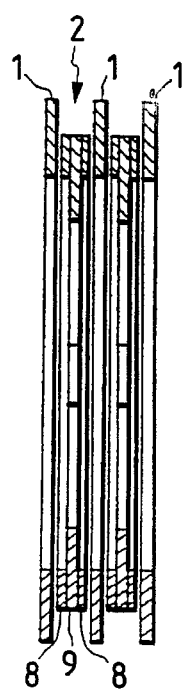
FIG. 3 is a side sectional view illustrating the conventional driven and driving plates.

Although a frictional material is provided on only one surface of each of the driven and driving plates, the present invention can be realized by bonding a frictional material on the opposite surfaces of each driving plate, as shown in FIG. 3. The later case may be used practically if necessary though there are problems, as mentioned above.

A frictional engagement apparatus according to the present invention has such a structure as mentioned above, and has the following effects:

(1) Improvement in dynamic and static friction coefficients;
(2) Elimination of peak generation by improvement in friction characteristic;
(3) Improvement in the change, over time, of a friction coefficient in long term use;
(4) Improvement of a wet frictional material and a frictional engagement apparatus; and so on.

Accordingly, it is possible to make the frictional engagement apparatus small in size, light in weight, and high in torque capacity. Furthermore, it is possible to obtain highly reliable products.

It is not too much to say the size of a recent automatic transmission depends on a frictional engagement apparatus, and the miniaturization of the frictional engagement apparatus can miniaturize the automatic transmission, and thereby positively influence the weight and style of an accommodating vehicle.

A frictional engagement apparatus according to the present invention can be applied not only to a multi-plate clutch described in the illustrated embodiment, but also to variations such as a direct-coupled clutch of a torque converter, a brake band (drum), and synchronizing ring of a manual transmission, and the like. Therefore, while the preferred embodiments of the present invention are shown and described herein, it is to be understood that the same is not so limited but shall cover and include any and all modifications thereof which fall within the purview of the invention.

What is claimed is:

1. A frictional engagement apparatus for transmitting power by frictional force between a driven plate and a driving plate, each of said plates comprising a metal plate to which is bonded a wet frictional material, wherein the frictional material is provided on one surface of each of said driven and driving plates and a ceramic thin film is formed on an other surface of each of said driven and driving plate, wherein said ceramic thin film comprises a ceramic thin film intermediate layer formed on a surface of a matrix constituting a body of said plates, and a ceramic thin film outer layer formed on a surface of said ceramic thin film intermediate layer, said ceramic thin film intermediate layer being formed of a member selected from the group consisting of the elements of Groups $IV_B$, $V_B$ and $VI_B$ of the periodic table, silicon, and aluminum, and the carbides, nitrides, and oxides thereof, said ceramic thin film outer layer being formed of a member selected from the group consisting of the elements of Groups $IV_B$, $V_B$ and $VI_B$ of the periodic table, silicon, and aluminum, and the carbides, nitrides, and oxides thereof, the composition of said ceramic thin film outer layer being different from that of said ceramic thin film intermediate layer.

2. A frictional engagement apparatus according to claim 1, wherein said ceramic thin film intermediate layer is formed on one of said plates, and said ceramic thin film outer layer is a boron nitride group film formed on the surface of said intermediate layer.

3. A frictional engagement apparatus according to claim 2, wherein said intermediate layer comprises a plurality of layers.

4. A frictional engagement apparatus according to claim 1, wherein said intermediate layer is in tight contact with said matrix and is formed of titanium carbide, and said ceramic thin film outer layer formed on the surface of said intermediate layer is formed of titanium nitride.

* * * * *